US012775248B2

(12) United States Patent

Zhou et al.

(10) Patent No.: US 12,775,248 B2
(45) Date of Patent: Oct. 27, 2026

(54) HYBRID REINFORCEMENT LEARNING (RL) TO CONTROL A WATER DISTRIBUTION NETWORK

(71) Applicant: Autodesk, Inc., San Francisco, CA (US)

(72) Inventors: Yuan Zhou, Waterloo (CA); Shu Wang, Hamilton (CA); Harsh Bakulchandra Patel, Etobicoke (CA); Michael Pennell, San Clemente, CA (US); Jieliang Luo, San Bruno, CA (US); Alexander Lamb, Lake Forest, CA (US)

(73) Assignee: AUTODESK, INC., San Francisco, CA (US)

( * ) Notice: Subject to any disclaimer, the term of this patent is extended or adjusted under 35 U.S.C. 154(b) by 281 days.

(21) Appl. No.: 18/760,741

(22) Filed: Jul. 1, 2024

(65) Prior Publication Data

US 2025/0021060 A1 Jan. 16, 2025

Related U.S. Application Data

(60) Provisional application No. 63/512,795, filed on Jul. 10, 2023.

(51) Int. Cl.
*G05B 13/02* (2006.01)
*G05B 13/04* (2006.01)

(52) U.S. Cl.
CPC ......... *G05B 13/0265* (2013.01); *G05B 13/04* (2013.01)

(58) Field of Classification Search
None
See application file for complete search history.

(56) References Cited

U.S. PATENT DOCUMENTS

| | | | |
|---|---|---|---|
| 10,001,792 B1 | 6/2018 | Packer et al. | |
| 2020/0073342 A1 | 3/2020 | Lee et al. | |
| 2021/0264307 A1 | 8/2021 | Higa | |
| 2022/0222608 A1* | 7/2022 | Lee | G06Q 10/063118 |

FOREIGN PATENT DOCUMENTS

| | | |
|---|---|---|
| WO | 2023/066497 | 4/2023 |
| WO | 2023066597 | 4/2023 |

OTHER PUBLICATIONS

European Examination Report dated Oct. 9, 2025 for European Patent Application No. 24187415.5.
Extended European Search Report dated Oct. 10, 2024 for European Patent Appln No. 24187415.5.

* cited by examiner

*Primary Examiner* — Carlos R Ortiz Rodriguez
(74) *Attorney, Agent, or Firm* — Gates & Cooper LLP

(57) ABSTRACT

A method and system control a water distribution network. A database is maintained of prior states based on a residential water demand, a tank level, and an energy tariff. A current state of the water distribution network is determined. Rewards are determined and include a tank level constraint, an energy cost, and a toggle count. A query based model is used to determine a set of control points used to control a first prior state. An RL agent is trained based on the prior states and rewards. The RL agent determines a control setpoint (that changes the pump speed) that maintains the tank level, minimizes the energy cost, and complies with the toggle count. The RL agent determines time slots and selects one of the time slots. Hybrid setpoints are generated to control the water distribution network within the selected time slot.

18 Claims, 10 Drawing Sheets

HYBRID REINFORCEMENT LEARNING (RL) TO CONTROL A WATER DISTRIBUTION NETWORK

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 63/512,795 filed on Jul. 10, 2023, with inventor(s) Yuan Zhou, Shu Wang, Harsh Bakulchandra Patel, Michael Pennell, Jieliang Luo, and Alex Lamb, entitled "Controlling Water Distribution Network with AI-Powered Controllers by Hybrid Reinforcement Learning (RL)".

BACKGROUND OF THE INVENTION

1. Field of the Invention

The present invention relates generally to water distribution networks, and in particular, to a method, apparatus, system, and article of manufacture for controlling a water distribution network using a hybrid method.

2. Description of the Related Art

Water distribution networks play a key role in ensuring that citizens have access to clean drinking water. These networks are comprised of a series of pipes, valves and pumps that carry water from the source to the end user. The water distribution network must be able to adapt its capacity to meet changes in demand over time. This process is known as optimization and involves finding an optimal solution for maximizing benefits while minimizing costs of energy consumption and/or the negative consequences of violating constraints.

Optimization solutions aim to provide real-time optimization recommendations for operators to follow. Generating the optimal solution in real-time is one of the challenges regularly faced. Prior art solutions are both (1) expensive (in terms of processing power and time), and (2) do not guarantee convergence.

The prior art combines clustering and genetic algorithms (GA) to reduce the number of iterations it takes to converge (i.e., on an optimal solution). However, this approach could not always guarantee (GA) convergence given the status of plants could be complex and uncertain to capture by clustering. In this regard, prior art based clustering/GA/evolution algorithms are based on swarm based optimization that require extensive computing power and significant iterations and training in order to identify the optimal control. In other words, prior art optimization systems require a large amount of time (e.g., over 10 hours) to converge on a feasible/optimal solution. Such excessive processing timing is in direct contradiction to the desire to have a real time recommendation for controlling a water distribution network. Further, the prior art systems are not stable and there is no guarantee that a solution will properly converge on a feasible solution.

In addition to the prior art being (1) expensive and (2) failing to guarantee convergence, prior art systems also try to find a solution that makes sense for a given simulation model but may generate results that are significantly different than the typical control in a database. Such a significant difference results in a hesitancy to adopt the solution. In other words, an optimization generated by the prior art may be an improvement over what was used in the past but may be so significantly different (from such a prior use) that a user is hesitant to adopt the recommendation. In this regard, a prior art recommended optimization may not be easy to accept/understood by users, and as such, user adoption of prior art recommendations may not be accepted and/or may be significantly delayed (e.g., users may be hesitant to adopt due to extreme differences suggested by a system or may feel that if adopted, the water distribution system may fail/break).

Accordingly, what is needed is the ability to minimize the expense of determining an optimal solution that is guaranteed to converge while also improving the adoption rate by a user.

SUMMARY OF THE INVENTION

Embodiments of the invention provide an artificial intelligence-powered controller that can handle complexity and uncertainty with real-time interference by leveraging warm-start strategies and reinforcement learning (RL).

In this regard, RL-based optimization in accordance with embodiments of the invention is adaptable to uncertainties and the inference time for trained agents is within a desirable timing range (e.g., within seconds and/or below a specified threshold time limit). Embodiments of the invention provide an AI (artificial intelligence)-powered controller by leveraging a warm-start strategy and RL-based optimization to incrementally introduce optimal control which makes final control-setpoints more robust from potential simulation errors.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Approach

The optimization problem to be solved is how to provide optimal control setpoints for operators based on previous experience and observations. This problem needs to be converted into a form suitable for reinforcement learning (RL). In this regard, to tackle this problem, embodiments of the invention formulate the problem as a Markov Decision Process (MDP) and leverage the RL GYM framework. GYM is an open-source PYTHON library for developing and comparing reinforcement learning algorithms by providing a standard application programming interface (API) to communicate between learning algorithms and environments, as well as a standard set of environments compliant with that API.

Figure 1:
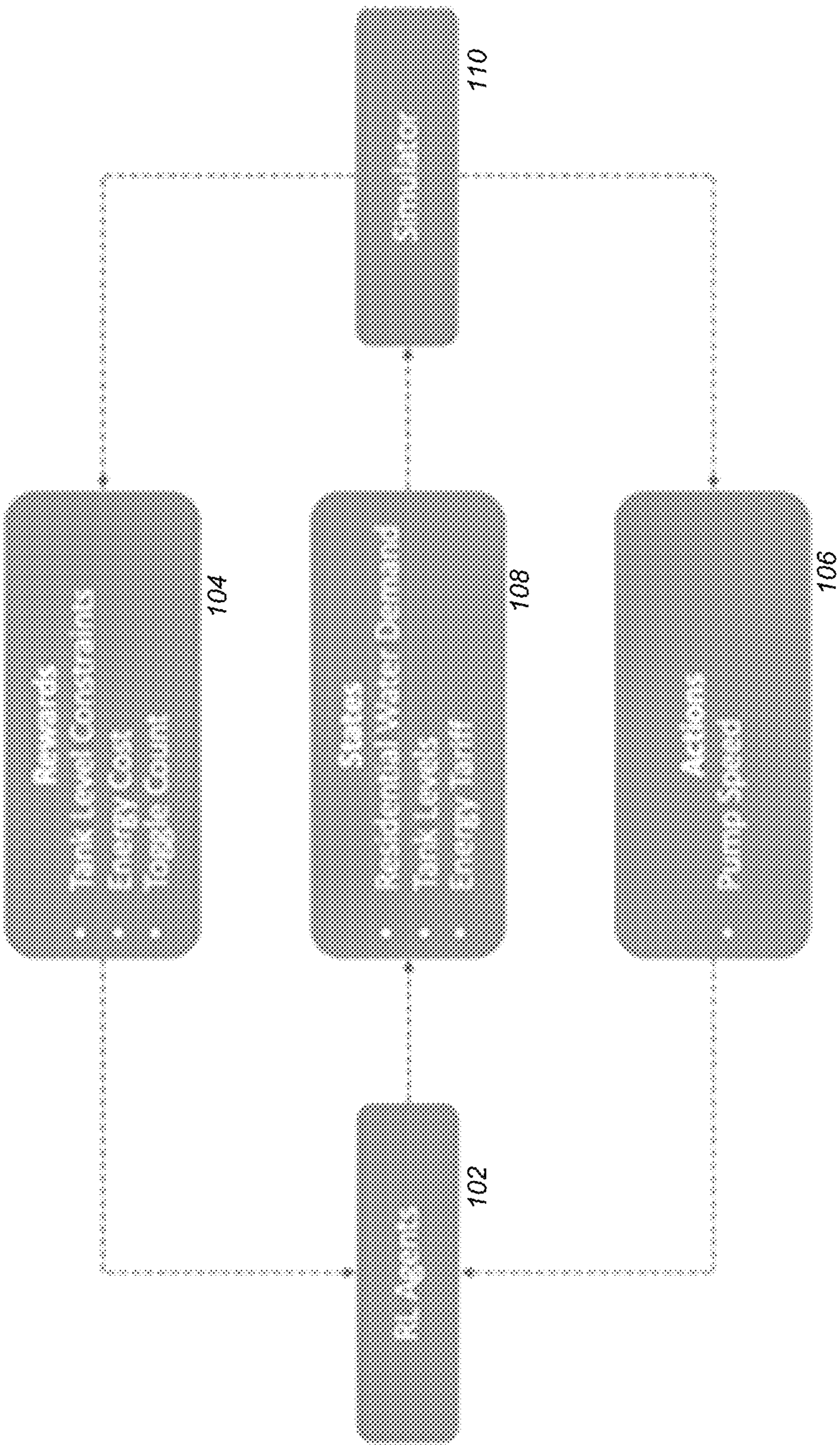
FIG. 1 illustrates the Reinforcement Learning (RL) framework of a water distribution network in accordance with one or more embodiments of the invention.

FIG. 1 illustrates the RL framework of a water distribution network in accordance with one or more embodiments of the invention. As illustrated, the RL agents 102 receive input in the form of rewards 104 and actions 106, and outputs the various states 108. In turn, the states 108 are utilized by a simulator 110 that updates the rewards 104 and actions 106 fed back to the RL agents 102.

In this regard, the states 108 that an operator uses to make decisions in the observation space need to be determined and may include the tank levels and latest pump status, the forecast of future water demands (i.e., the residential water demand), and energy tariff structures. Based on the desired goals, embodiments of the invention attempt to ensure that in addition to system constraints, the following three (3) objectives/constraints/rewards are met: (1) a desired tank level; (2) a maximization in energy cost savings; and (3) a limit in the number of control changes utilized on a defined temporal basis (e.g., daily). The rewards 104 are established to accomplish/specify such constraints. The actions 106 (e.g., pump speed) are defined to control the system. RL (via the RL agents 102) are trained to work with the simulator 110 to maintain the current state of the site/water distribution network and determining the optimal control for the desired output.

In view of the above, in the context of the problem, the GYM's reward system enables rewards 104 to be represented for different actions 106 (e.g., pump speed) and states 108. Positive rewards can be assigned to actions 106 leading to desirable outcomes, such as reaching target setpoints or avoiding system failures. Conversely, negative rewards can be assigned to suboptimal actions. Additionally, embodiments of the invention (e.g., via GYM) enable the incorporation of constraints as conditions that must be met during the learning process. For example, one can restrict the range of values for specific parameters or limit the frequency of certain actions. With GYM's flexible interface, discrete or continuous action spaces may be used to represent operator choices and adjust parameters. By leveraging GYM, the optimization problem may be modeled as an MDP, representing rewards 104, constraints, and various aspects of the problem domain. This allows the development and evaluation of reinforcement learning algorithms, providing operators with optimal control setpoints based on their experiences and observations.

In the MDP framework, the observation space encompasses various factors/states 108 such as tank levels, pump statuses, demand forecasts (e.g., residential water demand), and energy tariffs. These observations/states 108 guide the decision-making process of the RL agent 102. Additionally, the rewards 104 in an MDP formulation of embodiments of the invention may consist of tank level constraints, energy costs, and toggle count, providing a comprehensive evaluation of the agent's performance.

In view of the above, FIG. 1 illustrates the detailed structure of an RL agent 102, that is designed to navigate the MDP environment and generate optimal control setpoints.

Considering the clear daily and seasonal patterns observed in energy tariffs and demand, the control horizon may be designed/evaluated on a daily basis. This means that the optimal solution should also follow the same daily frequency. Each control setpoint is determined at a fifteen (15)-minute interval, and the RL agent 102 interacts with the environment ninety-six (96) times to provide recommendations for the next twenty-four (24) hours.

To train the RL agent 102, two different RL algorithms may be employed: Proximal Policy Optimization (PPO) and R2D2. PPO is an on-policy RL algorithm known for its stable performance, which helps evaluate assumptions and initial results. Once a minimum threshold of satisfaction with the initial outcomes has been achieved, embodiments of the invention may transition to region-based recursive doppler dealiasing (R2D2), a distributed off-policy RL algorithm that offers improved sample efficiency, enabling the achievement of optimal performance.

Environment

Figure 2:
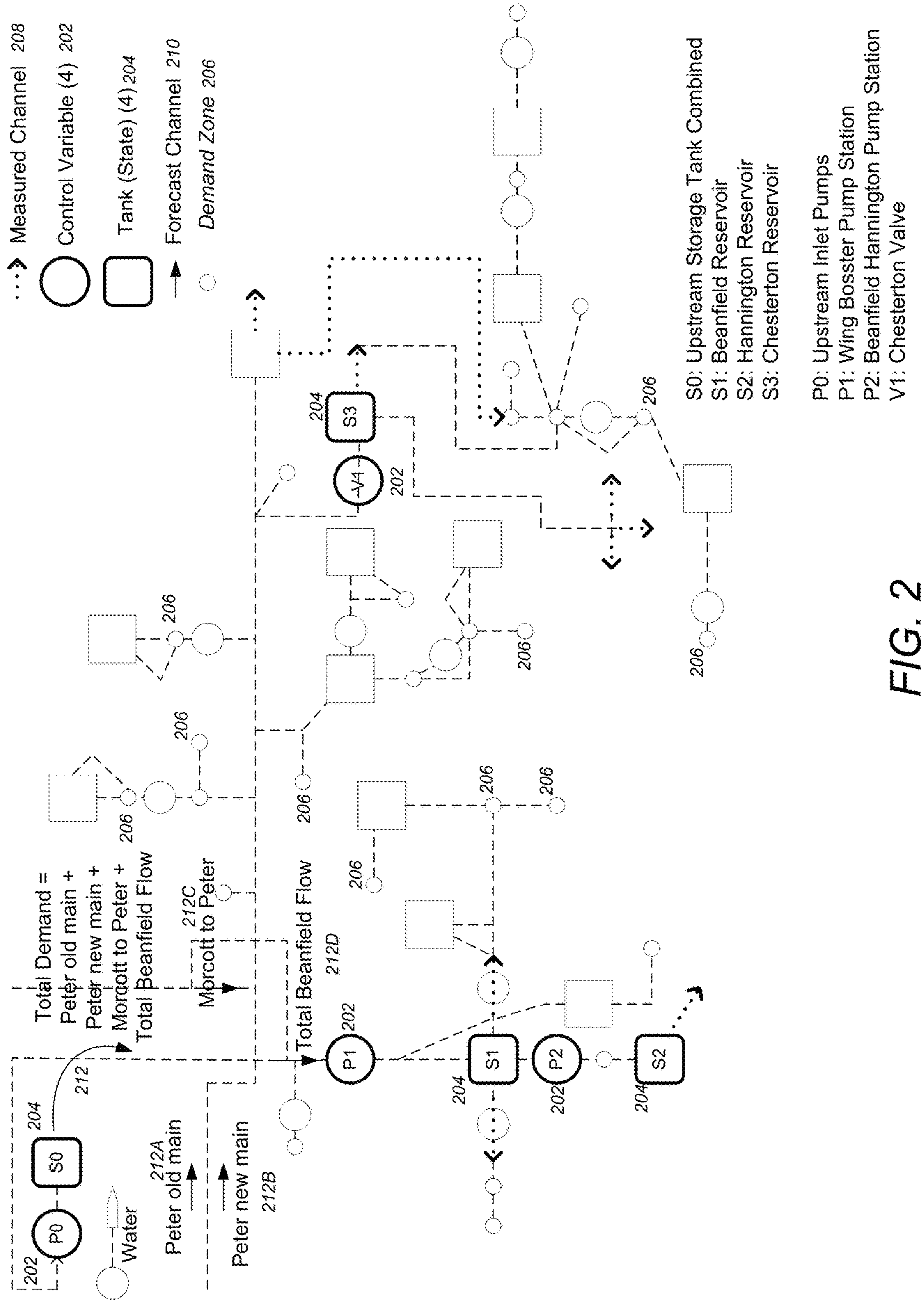
FIG. 2 illustrates the structure of an Anglian water distribution network in accordance with one or more embodiments of the invention.

The environment used to train the RL-agent 102 is shown in FIG. 2. In this regard, FIG. 2 illustrates the structure of an Anglian water distribution network in accordance with one or more embodiments of the invention. As illustrated, there are more than four (4) control variables 202 consisting of pump/valve stations (P0-P2 and V1), four (4) tanks/reservoirs 204 (S0-S3), and numerous demands/demand zones 206. Further, the measured channels 208 and forecast channels 210 are illustrated. Embodiments of the invention provide the machine-learning based simulation for this complex structure of a water distribution network.

As illustrated, the Total Demand 212 consists of the Peter old main 212A+the Peter new main 212B+the Morcott to Peter 212C+the Total Beanfield flow 212D. In FIG. 2, the control variables 202 (P0-P2 and V1) control the water flow/distribution in the network. Thus, FIG. 2 illustrates the structure of an Anglian water distribution network where all of the demand zones 206 are consuming water and tanks 204 are used as storage of the water to meet the demands. The entire network is designed to pump the water from the sources from top left upstream and providing water for the demand zones 206 at the end without violating the operation constraints.

Figure 3:
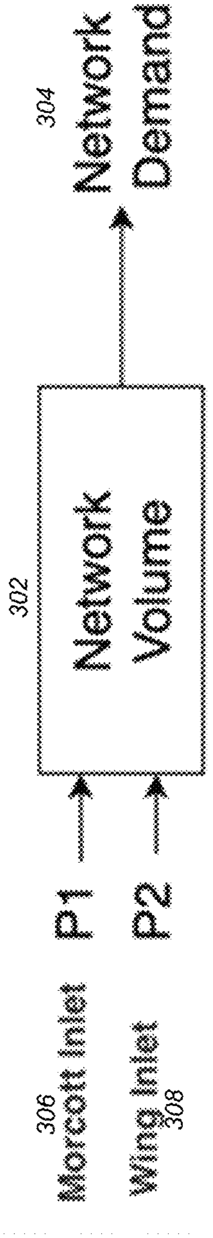
FIG. 3 illustrates a more generalized/simplified structure of the water distribution network of FIG. 2 in accordance with one or more embodiments of the invention.

Based on the complexity of the problem as illustrated in the distribution network of FIG. 2, it may be desirable to simplify/generalize the problem/network in terms of the three objectives (e.g., the constraint violation, energy savings, and toggle count). FIG. 3 illustrates a more generalized/simplified structure of the water distribution network of FIG. 2 in accordance with one or more embodiments of the invention. The generalized version of the complex structure represents all the tanks/reservoirs 204 in a single tank 302 (Total Network Volume) and combining all the demands 206 in a single demand 304 (Total Network Outlet/Network Demand). The control setpoints are the Total Inlet Flow (Morcott Inlet 306 (P1)+Wing Inlet 308 (P2)) representing the main source of the inlet for the plant.

Three (3) objectives were primarily considered while training the RL agent 102:

1. Constraint Violations: Keep the level under upper/lower constraints;
2. Energy Savings: Energy optimization with respect to tariff structure; and
3. Toggle count: Keep the count of change in control setpoints under a defined threshold.

Evaluation & Results

After training the RL-agent 102, a list of experiments was prepared to evaluate its performance in energy saving, constraint violations, and toggle count. The experiments maintained perspective by introducing various initial conditions and abnormal demand patterns.

In one or more embodiments, the AWS (AMAZON WEB SERVICES) SAGEMAKER RL estimator may be used to perform the experiments. The GYM framework may be used to prepare the custom environment. The following results were generated using a PPO (proximal policy optimization) agent from a library (e.g., RLLIB) that is compatible with the GYM framework. The reward function may be prepared such that the agent can be reinforced correctly for all three (3) objectives in the right manner.

Figure 4:
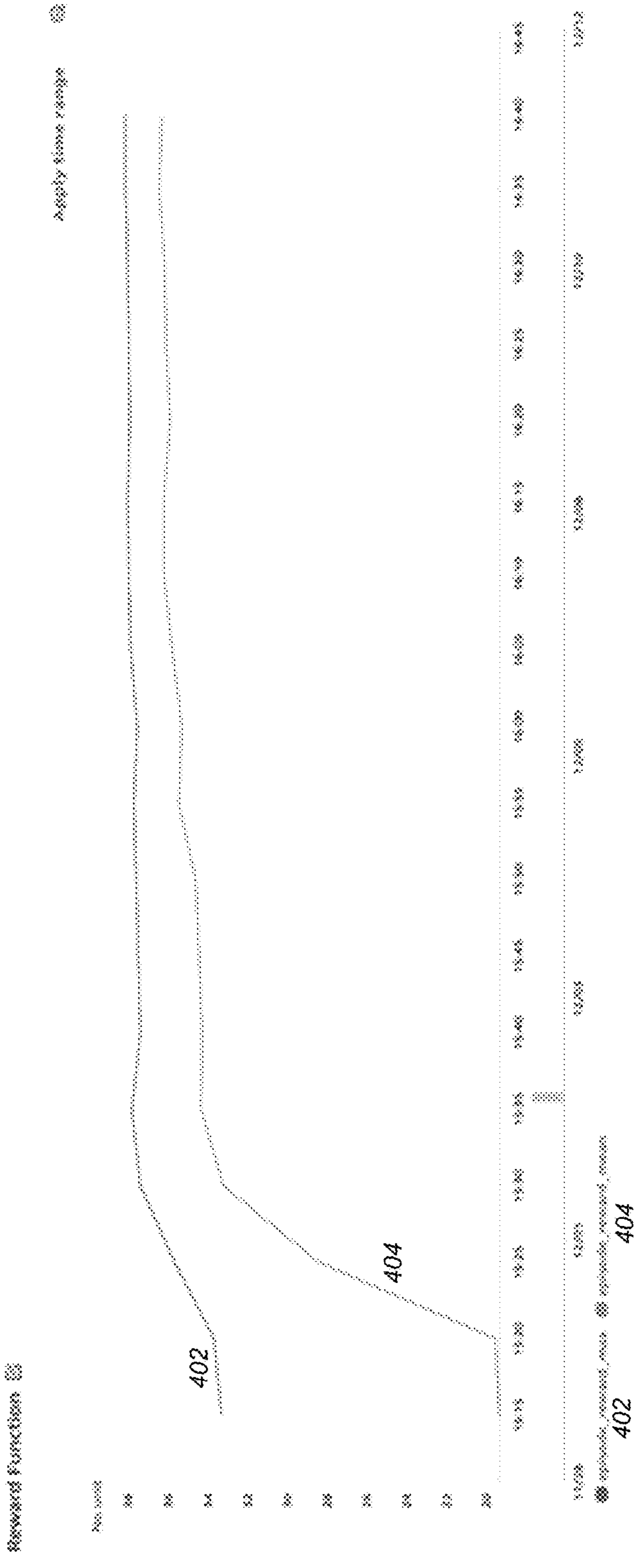
FIG. 4 represents the convergence of the reward function in accordance with one or more embodiments of the invention.

FIG. 4 represents the convergence of the reward function in accordance with one or more embodiments of the invention. In particular, the set of experiments were performed for the simpler version of the network (i.e., the network illustrated in FIG. 3). It can be observed that RL training converges well with stability. As illustrated, the horizontal axis provides the time range while the vertical axis reflects the number of units rewarded. As time passes the episode reward max 402 and episode reward mean 404 approach convergence (e.g., beginning around 15:35 on December 2).

Figure 5:
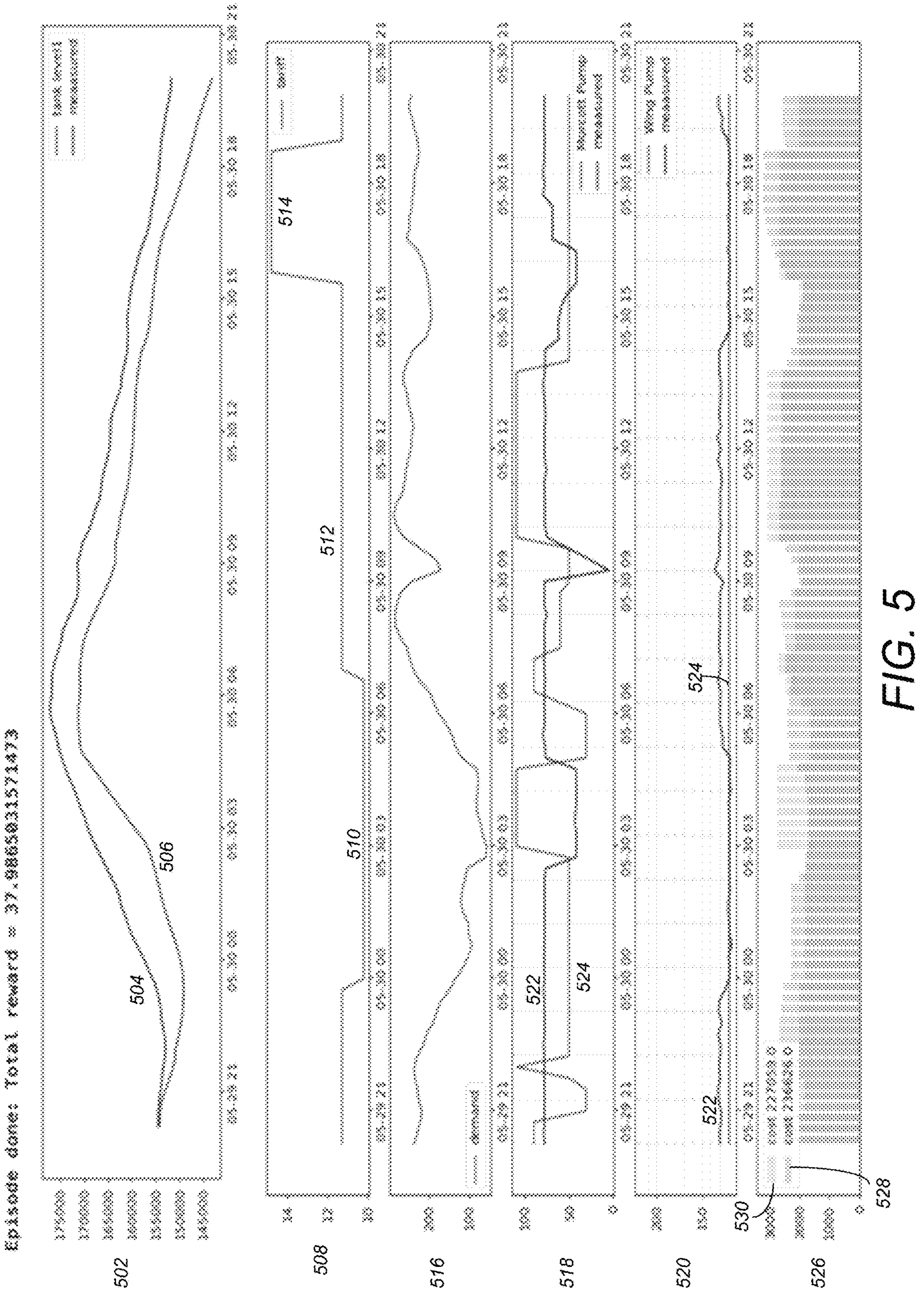
FIG. 5 illustrates an example of RL agent actions in accordance with one or more embodiments of the invention.

FIG. 5 illustrates an example of RL agent actions in accordance with one or more embodiments of the invention. Specifically, the plots illustrated in FIG. 5 represent an example date analyses for 29 May 2021. The plots are for Volume (plot 502), Tariff (plot 508), Demand (plot 516), Pumps (plot 518) and Tariff channels (plot 520) representations along with the measured data. The plots of FIG. 5 serve to illustrate how the controls look after a model is trained and a comparison of the different methods that may be utilized.

The first plot 502 illustrates a comparison between the measured historical data 504 and the data controlled by RL 506, representing the tank volumes. Overall, the RL-driven levels remain well within the defined constraints (140,000-180,000).

The second plot 508 displays the tariff cost values (i.e., the energy price) for a specific date(s) (29 May 2021 and 30 May 2021). It clearly shows three distinct tariff levels: low 510, medium 512, and high 514. It is desirable to use more energy in a low tariff period than in a higher tariff period because it is less expensive.

The third plot 516 showcases the demand pattern for the same dates (29 May 2021 and 30 May 2021) (i.e., the amount of water needed to satisfy the residential demand).

Moving on to the fourth plot 518 and fifth plot 520, they depict comparisons between the measured historical data

522 and the RL-controlled data 524 for the control set points of Morcott (plot 518) and Wing Pumps (plot 520). It is evident that RL adjusts the water pumping accordingly, reducing it during high tariff periods and increasing it during low tariff periods.

In chart 526, a comparison of the costs between the measured data (measured data costs 528) and the RL-driven solution (RL-driven solution costs 530) may be observed. The results indicate that the overall cost of the RL-driven solution is lower than the measured data, while the final state remains relatively unchanged. This suggests that RL effectively leverages the tariff structure to achieve cost savings.

Figure 6:
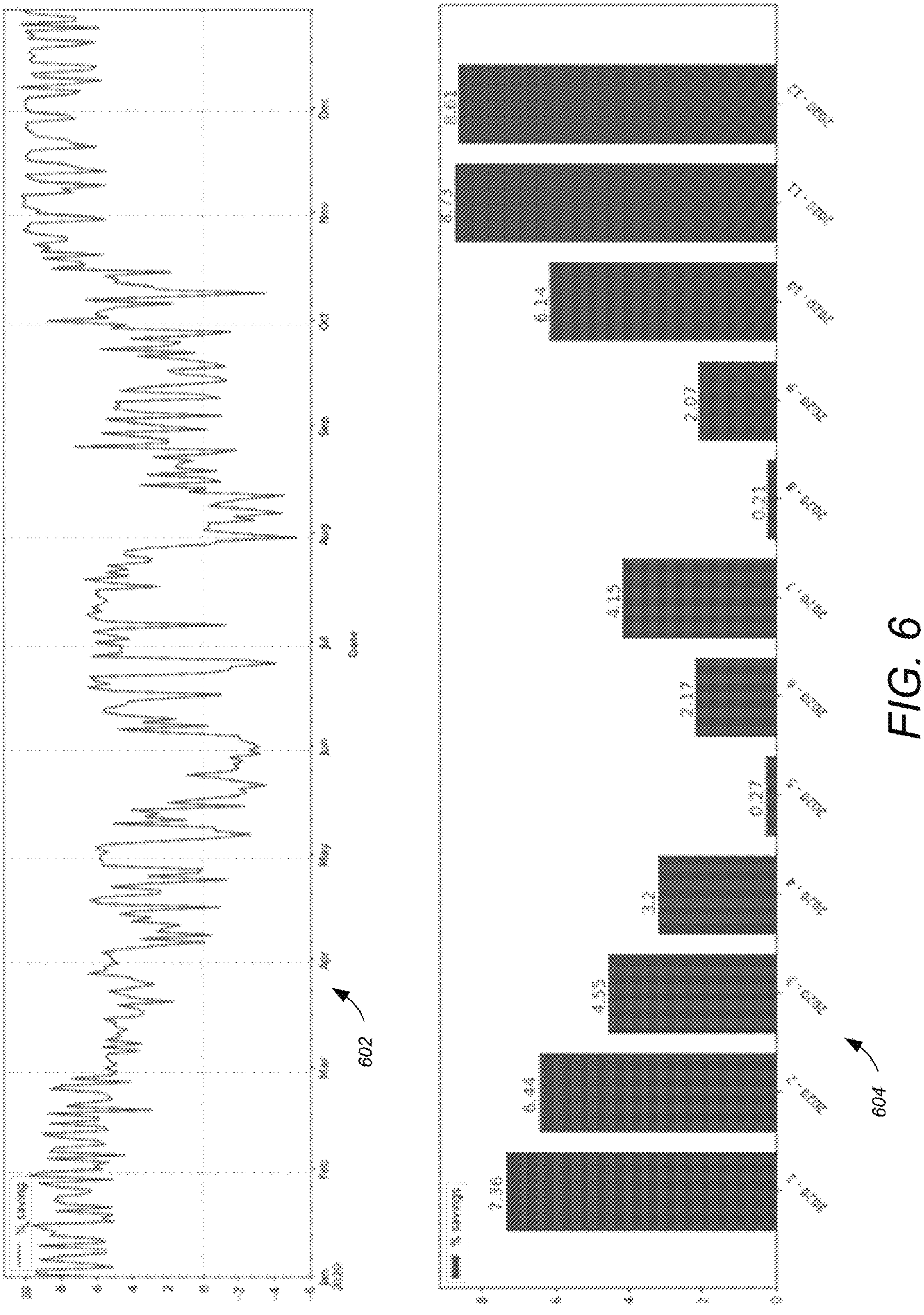
FIG. 6 illustrates the monthly savings report from RL agents in accordance with one or more embodiments of the invention.

A more thorough cost savings analysis was carried out for every day of the year 2020. FIG. 6 illustrates the monthly savings report from RL agents in accordance with one or more embodiments of the invention. The time series plot 602 represents the cost savings for each day of 2020 and bar chart 604 represents the monthly aggregated savings. Yearly average saving percentage comes out ~4.5% and fairly distributed over months.

In view of the above, the plots of FIG. 5 and FIG. 6 demonstrate that RL optimization works for energy and constraint compliance.

Deployment

Figure 7:
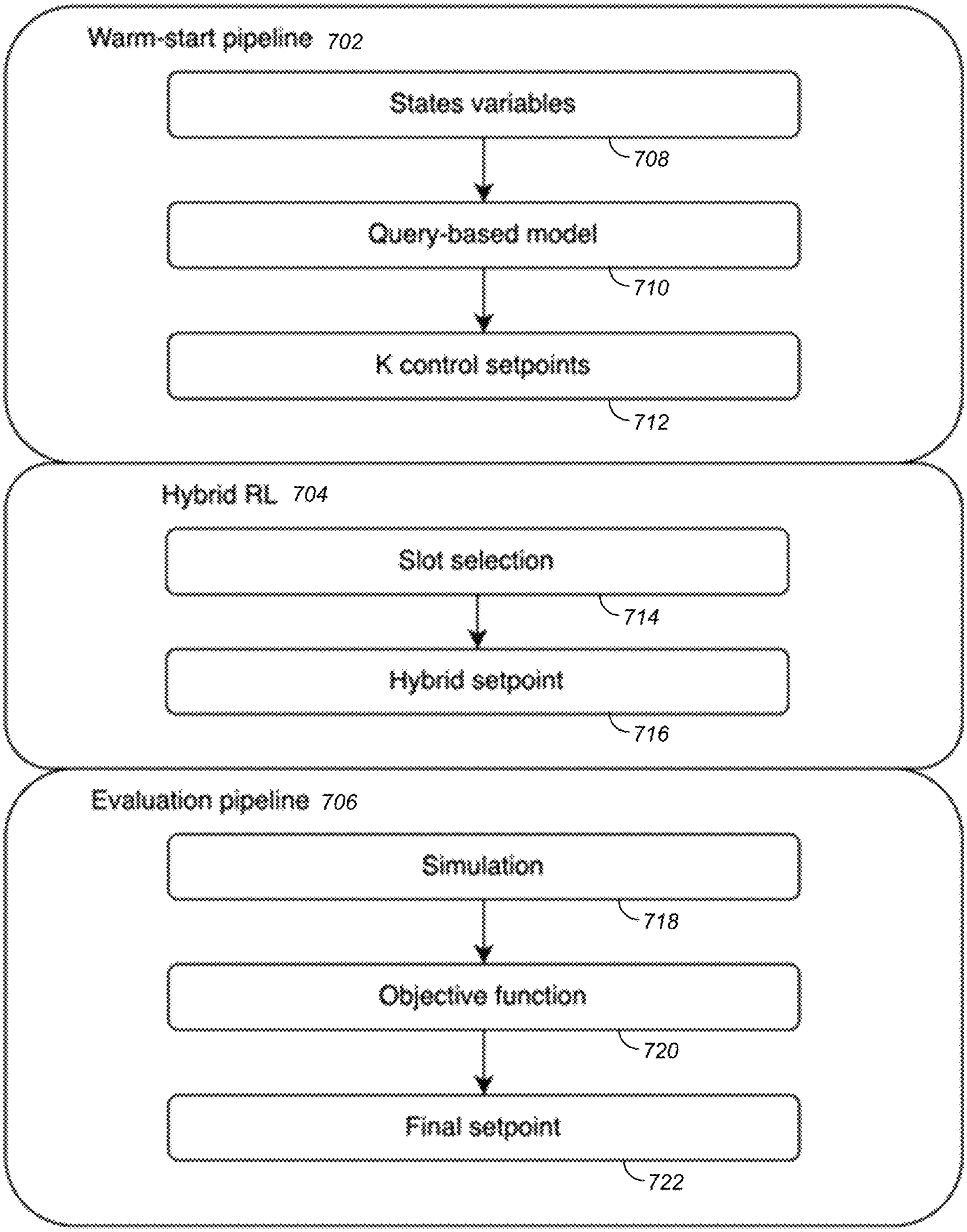
FIG. 7 illustrates the workflow of a hybrid RL deployment in accordance with one or more embodiments of the invention.

In one or more embodiments, it may be desirable to utilize a hybrid RL to smooth the experience of adopting suggested controls. Such a hybrid RL based approach may be referred to as a warm start model/strategy. In other words, embodiments of the invention may utilize a deployment pipeline that is designed to apply the RL-agent in near real-time recommendations via a combination of a warm start query-based strategy with RL (referred to herein as a hybrid-RL pipeline). FIG. 7 illustrates the workflow of a hybrid RL deployment in accordance with one or more embodiments of the invention.

There are three portions 702-706 of the Hybrid-RL pipeline, the first part called the warm-start pipeline 702 is to find out the K-nearest setpoints that the client previously applied to a state of the water distribution network that was close to the current state of the water distribution network. In the warm-start pipeline 702, the state variables 708 are fed to a query-based model 710 (which is a separate model from the simulator or RL model) to determine the K control setpoints 712. In other words, the current measured states 708 are passed to the query-based model 710. The query-based model 710 provides a best guess that attempts to estimate if the operator will make a decision under similar circumstances (i.e., what control is the operator likely to apply under similar circumstances).

The second part is called the Hybrid RL 704 which utilizes the best guess (i.e., the k control setpoints 712 from the query-based model 710) to determine which controls to provide to the operator over a defined time period (e.g., the next 24 hours). The hybrid RL 704 will first perform a slot selection 714 in which a subset among the next 24 hour period is selected based on different criteria to let the RL agent generate setpoints to combine with the result obtained from the warm-start pipeline 702. In other words, slot selection 714 provides for the selection of a slot (i.e., of time/time period) and the RL agent generates hybrid setpoints 716. In this regard, based on the K control setpoints 712 (i.e., the best guesses), an algorithm is applied to determine which portion (e.g., time slot) is most valuable to change. With a straight RL model, everything would be changed. However, in the hybrid-RL, the time slot/portion that is the most likely to provide the most value to optimize the savings may be selected. Thus, embodiments of the invention identify and select the most valuable time slot/portion.

Further to the above, different threshold limits may be utilized to limit the search of the vulnerable time slots. For example, embodiments of the invention may limit the beginning to a maximum of two (2) hours of the control that an operator can easily accept/adopt. After the beginning time slot/period, a single schedule of different controls may be utilized for the subsequent 24 hours. In other words, the most vulnerable control that is likely to what an operator would accept/adopt is identified and provided for an initial time period. Thereafter, embodiments of the invention may progressively transition to providing more suggestions from an RL system (to slowly shift the user to adopting suggested changes/controls).

Figure 8:
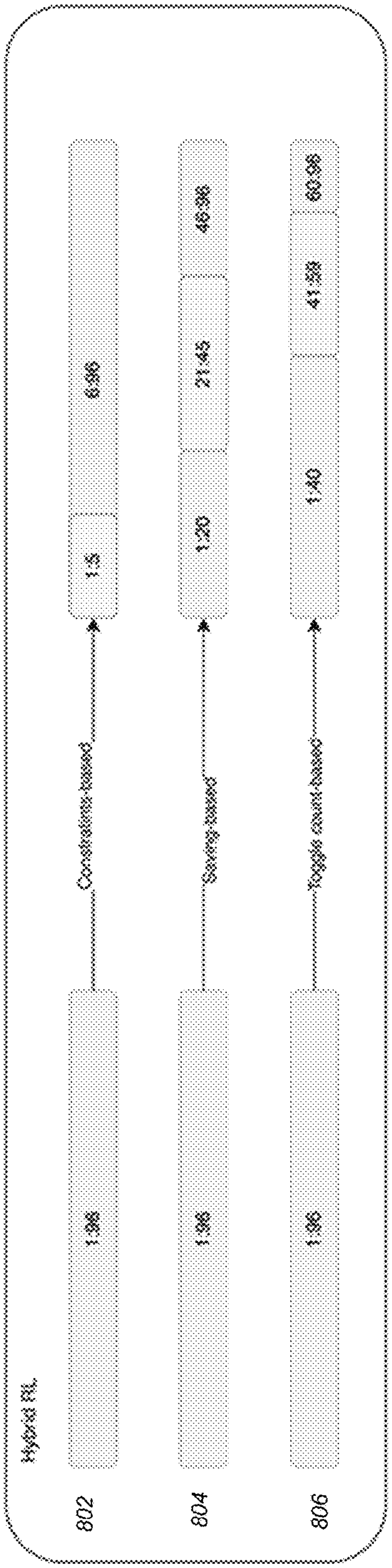
FIG. 8 illustrates the slot selection strategy of a hybrid RL in accordance with one or more embodiments of the invention.

An example of the criteria that may be used to select and combine setpoints for a time period of 1:96 is shown in FIG. 8. More specifically, FIG. 8 illustrates the slot selection strategy of a hybrid RL in accordance with one or more embodiments of the invention. The slot strategy illustrated in FIG. 8 provides the incremental introduction of more and more changes provided/proposed/suggested to the operator. For example, at the beginning only 1-2 changes may be suggested and as time progresses, more and more changes are suggested/proposed. As illustrated at 802, the time period for a constraint based slot selection strategy (e.g., keeping the level of a tank under upper/lower constraints) is used to select the time slot of 1:5 (leaving 6:96 left of the full time slot). At 804, a savings based slot selection strategy (e.g., to optimize energy/cost savings with respect to a tariff structure) is used to select the time slot of 21:45, and at 806, a toggle count based slot selection strategy (e.g., keeping the count of change in control setpoints under a defined threshold) to select the time slot of 41:59. In the end, embodiments of the invention may put hybrid control setpoints into a simulation engine and use an objective function(s) to select the best setpoint to recommend in real-time (i.e., dynamically as a water distribution network is being controlled).

Once the deployment pipeline is running, the system will monitor the adherence of setpoints based on data in a real-time/dynamic manner (e.g., the actual time during which something takes place such as the distribution of water over a water distribution network and/or the use of different controls while the water is being distributed).

Figure 9:
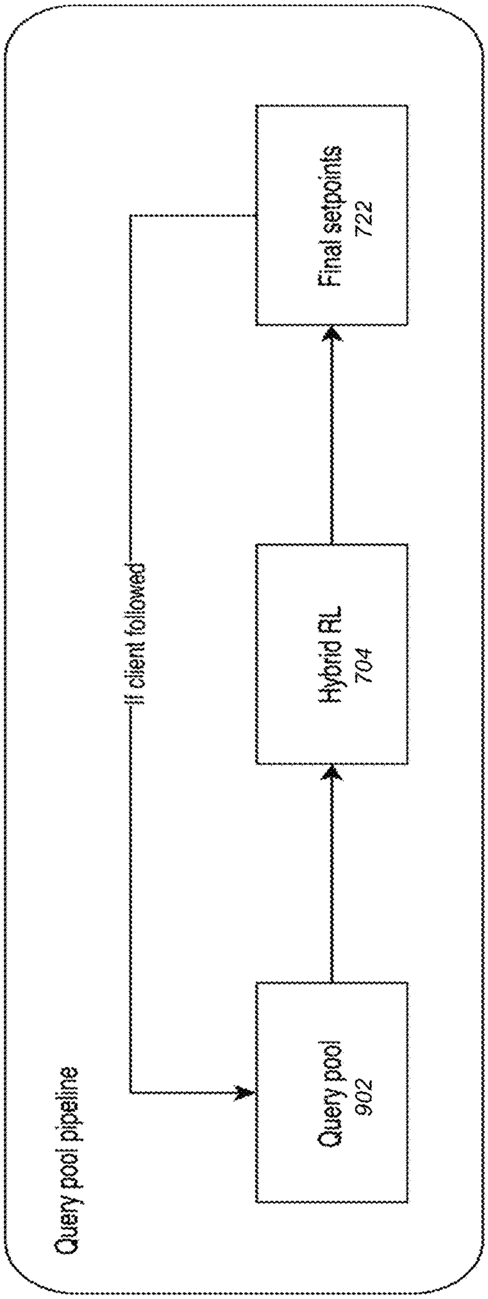
FIG. 9 illustrates a query pool update workflow in accordance with one or more embodiments of the invention.

FIG. 9 illustrates a query pool update workflow in accordance with one or more embodiments of the invention. Referring to FIG. 9 and FIG. 7, the seeds pool 902 used by query models in the warm-start pipeline 702 may be updated by previous hybrid RL 704 setpoints (i.e., if a client followed the final setpoints 722). In these cases, the system could automatically/autonomously increase the portion of the subset of setpoints 722 from the RL 704 that improves the user experience since a new setpoint pattern/new setpoints 722 from the RL 704 are slowly introduced based on what the user/client is already familiar with. In other words, as the operator/client begins to apply suggested solutions/controls, embodiments of the invention will continuously and automatically/autonomously introduce more and more changes slowly (e.g., at a defined rate and/or based on a schedule/progressive schedule) to increase the operator/client comfort with suggested changes.

Embodiments of the invention may also enable different objectives to be specified for the algorithm (e.g., to reduce the risk of the system and/or to save energy). Different targets/objectives may have different impacts and may establish a priority/preference. For example, if the focus is on tank level constraints and the system determines that a certain time period such as 1-2 PM under a certain control may break the upper bound limit of the tank level, embodiments of the invention may focus on the control during that time period as the most vulnerable portion and provide suggestions to reduce the potential of breaking the limit during that time period.

General Logical Flow

Figure 10:
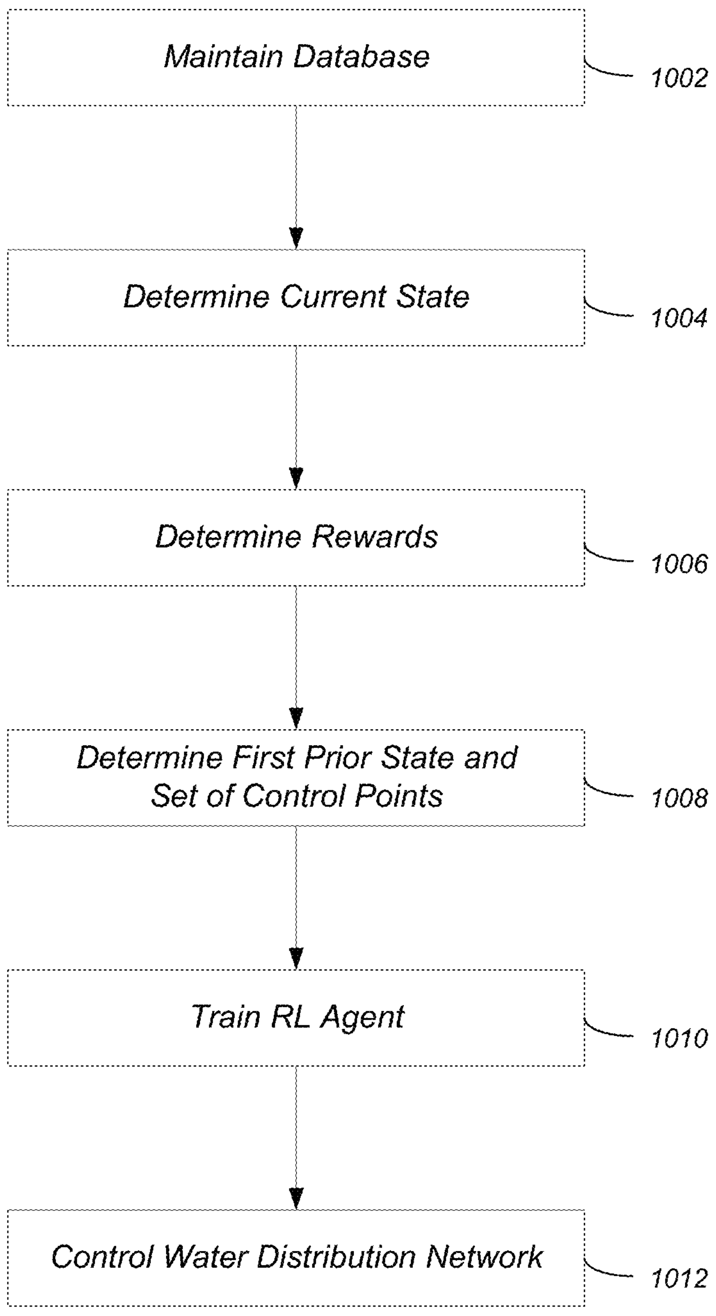
FIG. 10 illustrates the general logical flow for controlling a water distribution network in accordance with one or more embodiments of the invention.

In view of the above, FIG. 10 illustrates the general logical flow for controlling a water distribution network in accordance with one or more embodiments of the invention.

At step 1002, a database is maintained. The database consists/comprises two or more prior states of the water distribution network. The two or more prior states are based on: (1) a residential water demand; (2) a tank level; and (3) an energy tariff that defines an energy cost for using energy during a specified time period.

At step 1004, a current state of the water distribution network is determined.

At step 1006, one or more rewards are determined. The rewards consist/comprise (1) a tank level constraint that specifies a minimum level or a maximum level for the tank level; (2) the energy cost; and (3) a toggle count for a number of times a control setpoint changes. As used herein, the control setpoint controls a pump speed.

At step 1008, a determination is made via a query based model that accesses the database. The determination consists of/comprises: (1) a first prior state from the two or more prior states based on a comparison with the current state; and (2) a set of the control setpoints that a prior user applied to the first prior state.

At step 1010, a reinforcement learning (RL) agent is trained based on the two or more prior states and the one or more rewards. The RL agent is trained to determine, in real-time, as water is utilized in the water distribution network, the control setpoint that: (i) maintains the tank level to comply with the tank level constraint; (ii) minimizes the energy cost based on the energy tariff and the residential water demand; and (iii) complies with the toggle count. It may also be noted that the control setpoint change the pump speed to cause a transition to a new state of the water distribution network and results in one or more of the one or more rewards.

In addition to the above, the RL agent is trained to (1) determine two or more time slots within a defined time period (with each of the two or more time slots based on different criteria); (2) based on the set of control setpoints, select a first time slot of the two or more time slots (i.e., the most valuable time slot/portion as described above); and (3) generate one or more hybrid setpoints to control the water distribution network within the first time slot (where the hybrid setpoint is based on the set of control points). In one or more embodiments, the first time slot is selected based on a determination of which of the two or more time slots is most likely to result in a maximum optimization of the one or more rewards. Further, the RL agent may select the first time slot within a defined threshold time range.

The training of the RL agent may also include the ability to enable selection of one or more different objectives. Each of the one or more selectable different objectives focuses on a different set of the one or more rewards (e.g., a combination of residential water demand and tank level, a combination of tank level and energy tariff, just based on residential water demand, etc.).

Subsequent to the first time slot, a schedule may be utilized to provide different hybrid setpoints. The schedule may define a progressive transition to providing an increasing number of hybrid setpoints generated by the RL agent.

At step 1012, the water distribution network is controlled based on the one or more hybrid setpoints.

The system may further monitor adherence of the one or more hybrid setpoints to the one or more rewards based on data (e.g., from the control of the water distribution network) in a real-time manner. Based on the adherence, the set of control setpoints that the prior user applied in the database may be updated by adding the one or more hybrid setpoints (i.e., to the set of control points in the database). A portion of the one or more hybrid setpoints generated by the RL agent (that are used to control the water distribution network) may then be autonomously increased (i.e., a greater portion/proportion of the hybrid setpoints generated by the RL agent may be provided as recommended actions/control points).

The control of the water distribution network may also include inputting the one or more hybrid setpoints into a simulation engine. The simulation engine simulates an effect of use of the one or more hybrid setpoints on the water distribution network. Based on the simulating, an objective function may be utilized to select one of the one or more hybrid setpoints to recommend in real-time dynamically as water flows through the water distribution network. Such objective functions may be based on compliance with the one or more rewards.

The control of the water distribution network may also include recommending, in real-time dynamically as water flows through the water distribution network, the hybrid setpoint to a user. Use of the recommended hybrid setpoint may then be monitored. The database can then be updated based on the use such that the RL agent can utilize the updated database to further control the water distribution network.

Hardware Environment

Figure 11:
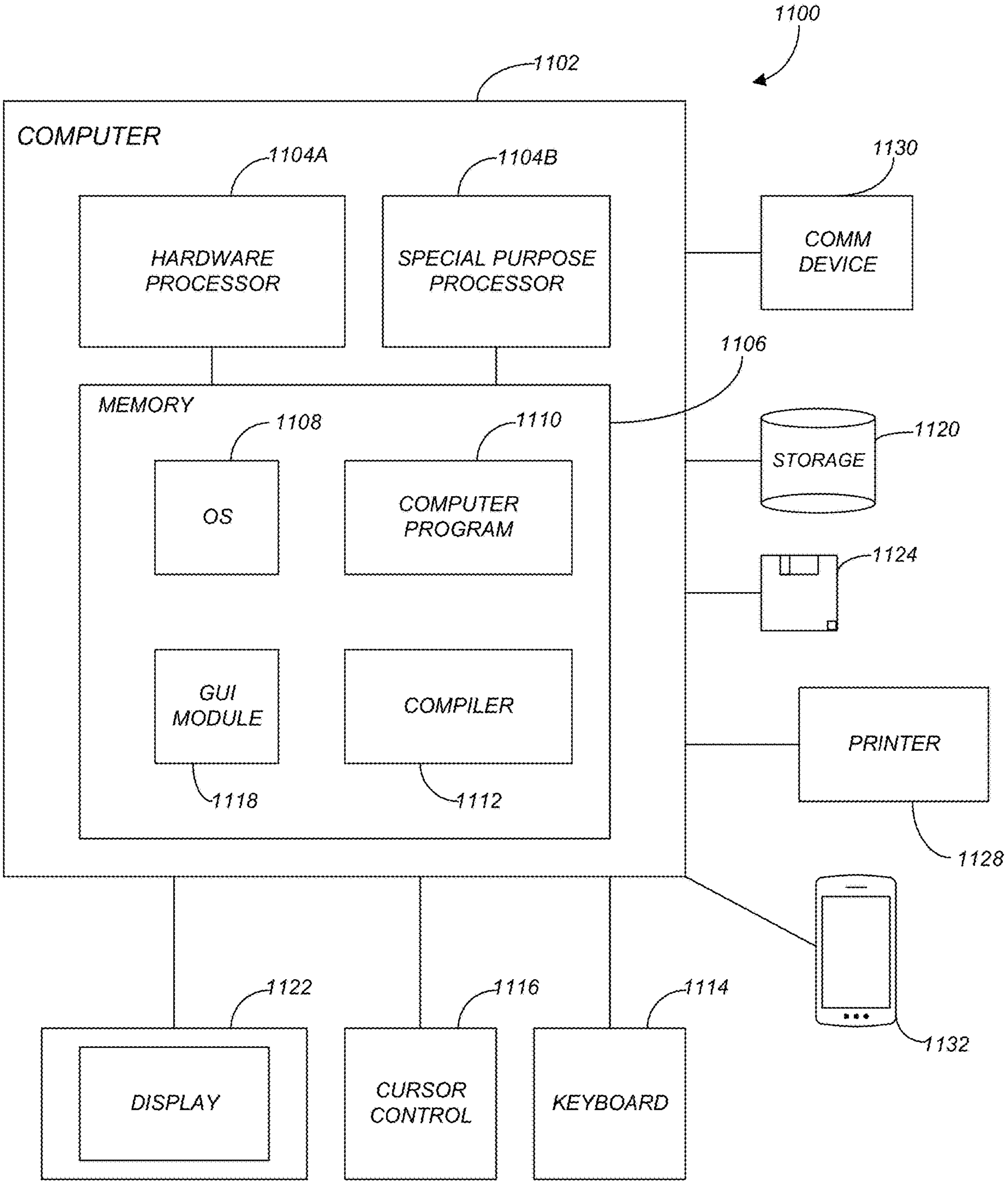
FIG. 11 is an exemplary hardware and software environment used to implement one or more embodiments of the invention.

FIG. 11 is an exemplary hardware and software environment 1100 (referred to as a computer-implemented system and/or computer-implemented method) used to implement one or more embodiments of the invention. The hardware and software environment includes a computer 1102 and may include peripherals. Computer 1102 may be a user/client computer, server computer, or may be a database computer. The computer 1102 comprises a hardware processor 1104A and/or a special purpose hardware processor 1104B (hereinafter alternatively collectively referred to as processor 1104) and a memory 1106, such as random access memory (RAM). The computer 1102 may be coupled to, and/or integrated with, other devices, including input/output (I/O) devices such as a keyboard 1114, a cursor control device 1116 (e.g., a mouse, a pointing device, pen and tablet, touch screen, multi-touch device, etc.) and a printer 1128. In one or more embodiments, computer 1102 may be coupled to, or may comprise, a portable or media viewing/listening device 1132 (e.g., an MP3 player, IPOD, NOOK, portable digital video player, cellular device, personal digital assistant, etc.). In yet another embodiment, the computer 1102 may comprise a multi-touch device, mobile phone, gaming system, internet enabled television, television set top box, or other internet enabled device executing on various platforms and operating systems.

In one embodiment, the computer 1102 operates by the hardware processor 1104A performing instructions defined by the computer program 1110 (e.g., a computer-aided design [CAD] application) under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108, to provide output and results.

Output/results may be presented on the display 1122 or provided to another device for presentation or further processing or action. In one embodiment, the display 1122 comprises a liquid crystal display (LCD) having a plurality of separately addressable liquid crystals. Alternatively, the display 1122 may comprise a light emitting diode (LED) display having clusters of red, green and blue diodes driven together to form full-color pixels. Each liquid crystal or pixel of the display 1122 changes to an opaque or translucent state to form a part of the image on the display in response to the data or information generated by the processor 1104 from the application of the instructions of the computer program 1110 and/or operating system 1108 to the input and commands. The image may be provided through a graphical user interface (GUI) module 1118. Although the GUI module 1118 is depicted as a separate module, the instructions performing the GUI functions can be resident or distributed in the operating system 1108, the computer program 1110, or implemented with special purpose memory and processors.

In one or more embodiments, the display 1122 is integrated with/into the computer 1102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program 1110 instructions. In one embodiment, the special purpose processor 1104B is an application specific integrated circuit (ASIC).

The computer 1102 may also implement a compiler 1112 that allows an application or computer program 1110 written in a programming language such as C, C++, Assembly, SQL, PYTHON, PROLOG, MATLAB, RUBY, RAILS, HASKELL, or other language to be translated into processor 1104 readable code. Alternatively, the compiler 1112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1110 accesses and manipulates data accepted from I/O devices and stored in the memory 1106 of the computer 1102 using the relationships and logic that were generated using the compiler 1112.

The computer 1102 also optionally comprises an external communication device such as a modem, satellite link, Ethernet card, or other device for accepting input from, and providing output to, other computers 1102.

In one embodiment, instructions implementing the operating system 1108, the computer program 1110, and the compiler 1112 are tangibly embodied in a non-transitory computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of computer program 1110 instructions which, when accessed, read and executed by the computer 1102, cause the computer 1102 to perform the steps necessary to implement and/or use the present invention or to load the program of instructions into a memory 1106, thus creating a special purpose data structure causing the computer 1102 to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1102.

Figure 12:
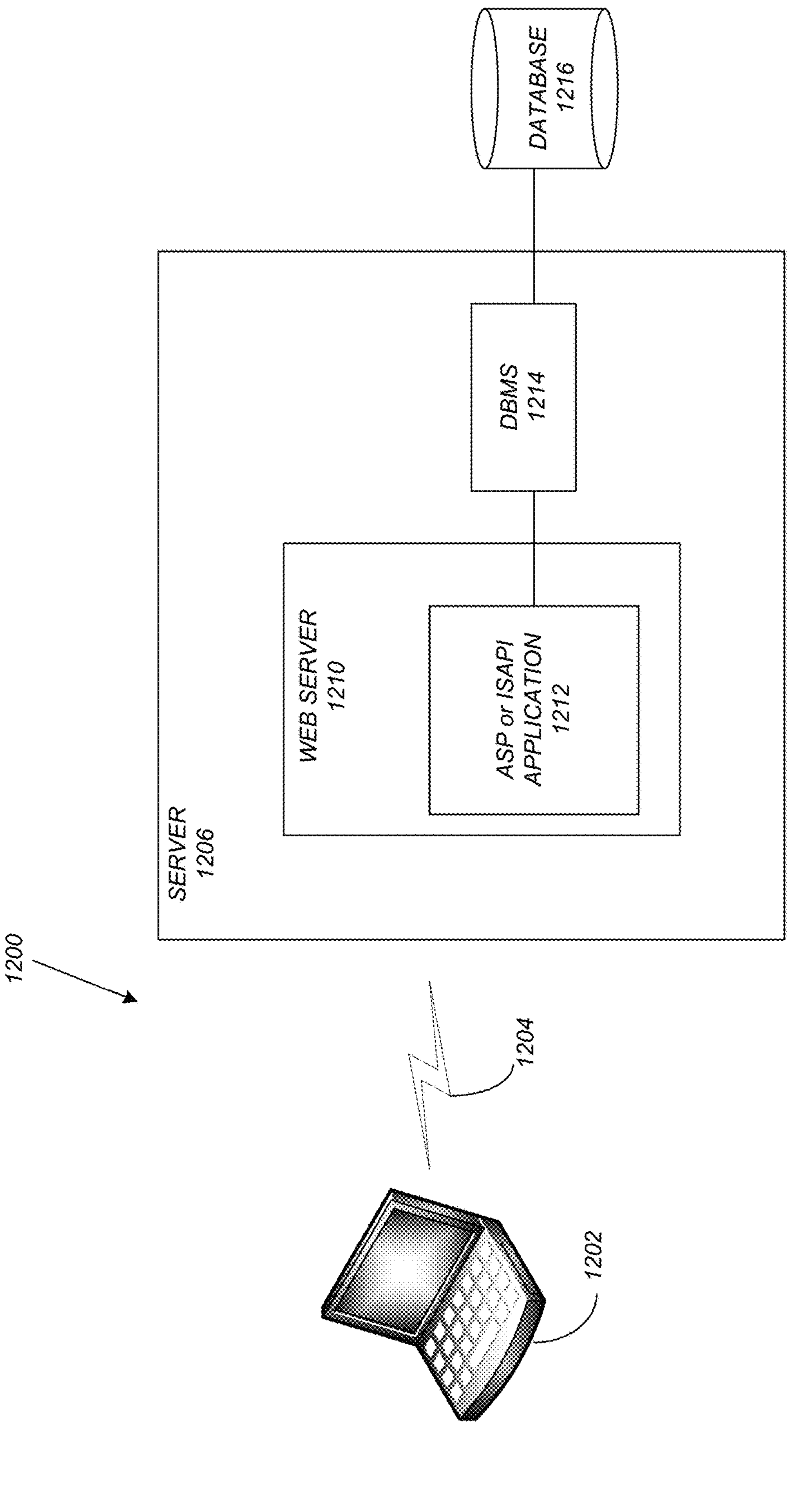
FIG. 12 schematically illustrates a typical distributed/cloud-based utilized in accordance with one or more embodiments of the invention.

FIG. 12 schematically illustrates a typical distributed/cloud-based computer system 1200 using a network 1204 to connect client computers 1202 to server computers 1206. A typical combination of resources may include a network 1204 comprising the Internet, LANs (local area networks), WANs (wide area networks), SNA (systems network architecture) networks, or the like, clients 1202 that are personal computers or workstations (as set forth in FIG. 11), and servers 1206 that are personal computers, workstations, minicomputers, or mainframes (as set forth in FIG. 11). However, it may be noted that different networks such as a cellular network (e.g., GSM [global system for mobile communications] or otherwise), a satellite based network, or any other type of network may be used to connect clients 1202 and servers 1206 in accordance with embodiments of the invention.

A network 1204 such as the Internet connects clients 1202 to server computers 1206. Network 1204 may utilize ethernet, coaxial cable, wireless communications, radio frequency (RF), etc. to connect and provide the communication between clients 1202 and servers 1206. Further, in a cloud-based computing system, resources (e.g., storage, processors, applications, memory, infrastructure, etc.) in clients 1202 and server computers 1206 may be shared by clients 1202, server computers 1206, and users across one or more networks. Resources may be shared by multiple users and can be dynamically reallocated per demand. In this regard, cloud computing may be referred to as a model for enabling access to a shared pool of configurable computing resources.

Clients 1202 may execute a client application or web browser and communicate with server computers 1206 executing web servers 1210. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1202 may be downloaded from server computer 1206 to client computers 1202 and installed as a plug-in or ACTIVEX control of a web browser. Accordingly, clients 1202 may utilize ACTIVEX components/component object model (COM) or distributed COM (DCOM) components to provide a user interface on a display of client 1202. The web server 1210 is typically a program such as MICROSOFT'S INTERNET INFORMATION SERVER.

Web server 1210 may host an Active Server Page (ASP) or Internet Server Application Programming Interface (ISAPI) application 1212, which may be executing scripts. The scripts invoke objects that execute business logic (referred to as business objects). The business objects then manipulate data in database 1216 through a database management system (DBMS) 1214. Alternatively, database 1216 may be part of, or connected directly to, client 1202 instead of communicating/obtaining the information from database 1216 across network 1204. When a developer encapsulates the business functionality into objects, the system may be referred to as a component object model (COM) system. Accordingly, the scripts executing on web server 1210 (and/or application 1212) invoke COM objects that implement the business logic. Further, server 1206 may utilize MICROSOFT'S TRANSACTION SERVER (MTS) to access required data stored in database 1216 via an interface such as ADO (Active Data Objects), OLE DB (Object Linking and Embedding DataBase), or ODBC (Open DataBase Connectivity).

Generally, these components 1200-1216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1202 and 1206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1202 and 1206. Embodiments of the invention are implemented as a software/CAD application on a client 1202 or server computer 1206. Further, as described above, the client 1202 or server computer 1206 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a hybrid RL-based approach to provide real-time optimal control setpoints for water distribution. By taking initial water levels and demand prediction as observation space, embodiments of the invention can find optimal setpoints that saves cost and maintains the constraints at the same time. In the deployment side, a query-based warm start approach is combined with an RL agent to incrementally introduce optimal RL setpoints based on their current operation routine which also make final setpoints more robust with potential simulation error.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for controlling a water distribution network, comprising: (a) maintaining a database of two or more prior states of the water distribution network, wherein the two or more prior states are based on: (1) a residential water demand; (2) a tank level; and (3) an energy tariff that defines an energy cost for using energy during a specified time period; (b) determining, a current state of the water distribution network; (c) determining one or more reward functions comprising: (1) a tank level constraint that specifies a minimum level or a maximum level for the tank level; (2) the energy cost; and (3) a toggle count for a number of times a control setpoint changes, wherein the control setpoint controls a pump speed; (d) determining, via a query based model that accesses the database: (1) a first prior state from the two or more prior states based on a comparison with the current state; (2) a set of control setpoints prior applied to the two or more prior states; (e) training a reinforcement learning (RL) agent based on the set of control setpoints and the one or more reward functions, wherein: (1) the trained RL agent determines, in real-time, as water is utilized in the water distribution network, a first value for the control setpoint that: (i) maintains the tank level to comply with the tank level constraint; (ii) minimizes the energy cost based on the energy tariff and the residential water demand; and (iii) complies with the toggle count; wherein the first value changes the pump speed to cause a transition to a new state of the water distribution network and result in the one or more reward functions; and (2) the trained RL agent: (1) determines two or more time slots within a defined time period, wherein each of the two or more time slots are based on different criteria; (2) based on the first value, selects a first time slot of the two or more time slots; and (3) generates one or more hybrid setpoints to control the water distribution network within the first time slot, wherein the one or more hybrid setpoints are based on the set of control setpoints; and (f) controlling the water distribution network based on the one or more hybrid setpoints.

2. The computer-implemented method of claim 1, wherein the selection of the first time slot is based on a determination of which of the two or more time slots is most likely to result in a maximum optimization of the one or more reward functions.

3. The computer-implemented method of claim 1, wherein: the trained RL agent selects the first time slot within a defined threshold time range.

4. The computer-implemented method of claim 1, further comprising:

subsequent to the first time slot, a schedule is utilized to provide different hybrid setpoints.

5. The computer-implemented method of claim 4, wherein the schedule defines a progressive transition to providing an increasing number of hybrid setpoints generated by the trained RL agent.

6. The computer-implemented method of claim 1, further comprising: monitoring adherence of the one or more hybrid setpoints to the one or more reward functions based on data in a real-time manner; updating, based on the adherence, the set of control setpoints by adding the one or more hybrid setpoints; autonomously increasing a portion of the one or more hybrid setpoints generated by the trained RL agent.

7. The computer-implemented method of claim 1, further comprising: enabling selection of one or more different objectives, wherein each of the one or more different objectives focuses on a different set of the one or more reward functions.

8. The computer-implemented method of claim 1, further comprising: inputting the one or more hybrid setpoints into a simulation engine; the simulation engine simulating an effect of use of the one or more hybrid setpoints on the water distribution network; based on the simulating, utilizing an objective function to select one of the one or more hybrid setpoints to recommend in real-time dynamically as water flows through the water distribution network, wherein the objective function is based on compliance with the one or more reward functions.

9. The computer-implemented method of claim 1, wherein the controlling the water distribution network comprises: recommending, in real-time dynamically as water flows through the water distribution network, the one or more hybrid setpoints; monitoring use of the recommended hybrid setpoint; updating the database based on the use; and the trained RL agent utilizing the updated database to control the water distribution network.

10. A computer-implemented system for controlling a water distribution network, comprising: (a) a computer having a memory; (b) a processor executing on the computer; (c) the memory storing a set of instructions, wherein the set of instructions, when executed by the processor cause the processor to perform operations comprising: (1) maintaining a database of two or more prior states of the water distribution network, wherein the two or more prior states are based on: (i) a residential water demand; (ii) a tank level; and (iii) an energy tariff that defines an energy cost for using energy during a specified time period; (2) determining, a current state of the water distribution network; (3) determining one or more reward functions comprising: (i) a tank level constraint that specifies a minimum level or a maximum level for the tank level; (ii) the energy cost; and (iii) a toggle count for a number of times a control setpoint changes, wherein the control setpoint controls a pump speed; (2) determining, via a query based model that accesses the database: (i) a first prior state from the two or more prior states based on a comparison with the current state; (ii) a set of control setpoints prior applied to the two or more prior states; (3) training a reinforcement learning (RL) agent based on the two or more prior states and the one or more reward functions, wherein: (i) the trained RL agent determines, in real-time, as water is utilized in the water distribution network, a first value for the control setpoint that: (A) maintains the tank level to comply with the tank level constraint; (B) minimizes the energy cost based on the energy tariff and the residential water demand; and (C)

complies with the toggle count; wherein the first value changes the pump speed to cause a transition to a new state of the water distribution network and result in the one or more reward functions; and (ii) the trained RL agent: (A) determines two or more time slots within a defined time period, wherein each of the two or more time slots are based on different criteria; (B) based on the first value, selects a first time slot of the two or more time slots; and (C) generates one or more hybrid setpoints to control the water distribution network within the first time slot, wherein the one or more hybrid setpoints are based on the set of control setpoints; and (4) controlling the water distribution network based on the one or more hybrid setpoints.

11. The computer-implemented system of claim 10, wherein the selection of the first time slot is based on a determination of which of the two or more time slots is most likely to result in a maximum optimization of the one or more reward functions.

12. The computer-implemented system of claim 10, wherein: the trained RL agent selects the first time slot within a defined threshold time range.

13. The computer-implemented system of claim 10, wherein the operations further comprise:

subsequent to the first time slot, a schedule is utilized to provide different hybrid setpoints.

14. The computer-implemented system of claim 13, wherein the schedule defines a progressive transition to providing an increasing number of hybrid setpoints generated by the trained RL agent.

15. The computer-implemented system of claim 10, wherein the operations further comprise: monitoring adherence of the one or more hybrid setpoints to the one or more reward functions based on data in a real-time manner; updating, based on the adherence, the set of control setpoints by adding the one or more hybrid setpoints; autonomously increasing a portion of the one or more hybrid setpoints generated by the trained RL agent.

16. The computer-implemented system of claim 10, wherein the operations further comprise: enabling selection of one or more different objectives, wherein each of the one or more different objectives focuses on a different set of the one or more reward functions.

17. The computer-implemented system of claim 10, wherein the operations further comprise: inputting the one or more hybrid setpoints into a simulation engine; the simulation engine simulating an effect of use of the one or more hybrid setpoints on the water distribution network; based on the simulating, utilizing an objective function to select one of the one or more hybrid setpoints to recommend in real-time dynamically as water flows through the water distribution network, wherein the objective function is based on compliance with the one or more reward functions.

18. The computer-implemented system of claim 10, wherein the controlling the water distribution network comprises: recommending, in real-time dynamically as water flows through the water distribution network, the one or more hybrid setpoints to a user; monitoring use of the recommended hybrid setpoint; updating the database based on the use; and the trained RL agent utilizing the updated database to control the water distribution network.

* * * * *